United States Patent
Goto

(10) Patent No.: US 12,420,600 B2
(45) Date of Patent: Sep. 23, 2025

(54) TIRE

(71) Applicant: BRIDGESTONE CORPORATION, Tokyo (JP)

(72) Inventor: Fumiya Goto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/564,727

(22) PCT Filed: Jul. 19, 2022

(86) PCT No.: PCT/JP2022/028109
§ 371 (c)(1),
(2) Date: Nov. 28, 2023

(87) PCT Pub. No.: WO2023/008264
PCT Pub. Date: Feb. 2, 2023

(65) Prior Publication Data
US 2024/0270027 A1     Aug. 15, 2024

(30) Foreign Application Priority Data
Jul. 26, 2021 (JP) ................................. 2021-121849

(51) Int. Cl.
*B60C 19/08* (2006.01)

(52) U.S. Cl.
CPC ............ *B60C 19/088* (2013.01); *B60C 19/08* (2013.01); *B60C 19/082* (2013.01)

(58) Field of Classification Search
CPC ..... B60C 19/08; B60C 19/082; B60C 19/084; B60C 19/086; B60C 19/088
See application file for complete search history.

(56) References Cited

U.S. PATENT DOCUMENTS

2005/0087275 A1* 4/2005 Zanzig .................. B60C 1/0016
                                                    152/451
2006/0102264 A1* 5/2006 Nicolas .................... B60C 19/08
                                                    152/152.1
(Continued)

FOREIGN PATENT DOCUMENTS

EP     3403854 A1    11/2018
EP     3260305 B1     3/2019
(Continued)

OTHER PUBLICATIONS

Alina—Lacramioara Apreutesei et al., Study of the Knitted Structures with Different Designs used for Electromagnetic Shielding, The 9th International Symposium on Advanced Topics in Electrical Engineering, 2015, pp. 352-355, XP032789123.
(Continued)

*Primary Examiner* — Kendra Ly
(74) *Attorney, Agent, or Firm* — KENJA IP LAW PC

(57) ABSTRACT

A rubber chafer is disposed on an outer side in the tire width direction of a bead filler. A tire comprises a conductive member. The inner end in the tire radial direction of the conductive member is located at a tire radial position of an outer end in the tire radial direction of the rubber chafer or in a tire radial region inner in the tire radial direction than the outer end in the tire radial direction of the rubber chafer. The conductive member extends from the inner end in the tire radial direction thereof outwardly in the tire radial direction to at least a position of any of the reinforcement layers which is conductive among the one or more reinforcement layers.

5 Claims, 2 Drawing Sheets

(56) References Cited

U.S. PATENT DOCUMENTS

| | | | |
|---|---|---|---|
| 2018/0186973 A1* | 7/2018 | Kitago | B60C 1/00 |
| 2020/0331308 A1* | 10/2020 | Fujiwara | B60C 15/06 |
| 2022/0258547 A1 | 8/2022 | Fukuzawa | |

FOREIGN PATENT DOCUMENTS

| | | | | |
|---|---|---|---|---|
| JP | H06127211 | A | 5/1994 | |
| JP | 2004082586 | A | 3/2004 | |
| JP | 2011126338 | A | 6/2011 | |
| JP | 5091938 | B2 | 12/2012 | |
| JP | 2014213747 | A | 11/2014 | |
| JP | 2015020499 | A | 2/2015 | |
| JP | 2016078742 | A | 5/2016 | |
| JP | 2018002137 | A | 1/2018 | |
| JP | 2019081401 | A | 5/2019 | |
| JP | 2019104424 | A | 6/2019 | |
| JP | 2020040634 | A | 3/2020 | |
| WO | WO-2019116615 | A1 * | 6/2019 | B25C 5/15 |
| WO | 2020256111 | A1 | 12/2020 | |

OTHER PUBLICATIONS

Aug. 27, 2024, search result of the Extended European Search Report issued by the European Patent Office in the corresponding European Patent Application No. 24169333.2.

Jan. 18, 2024, International Preliminary Report on Patentability issued in the International Patent Application No. PCT/JP2022/028109.

Dec. 5, 2024, search result of the Extended European Search Report issued by the European Patent Office in the corresponding European Patent Application No. 22849326.8.

Oct. 4, 2022, International Search Report issued in the International Patent Application No. PCT/JP2022/028109.

Jul. 21, 2025, search result of the Extended European Search Report issued by the European Patent Office in the corresponding European Patent Application No. 25172066.0.

* cited by examiner

TIRE

TECHNICAL FIELD

This disclosure relates to a tire.

BACKGROUND

For example, a tire comprising a carcass consisting of one or more carcass ply is known, as described in Patent Document 1.

CITATION LIST

Patent Literature

PTL 1: JP 2015/20499 A1

SUMMARY

Technical Problem

In recent years, there has been a growing demand to reduce rolling resistance in tires. To this end, the amount of carbon in the coating rubber of the carcass ply, for example, is sometimes reduced in order to reduce the loss tangent of the coating rubber. However, reducing the amount of carbon could increase the electrical resistance of the coating rubber, and the conductive path from the bead portion to the tread portion could be blocked by the carcass ply. In this case, it was sometimes difficult for static electricity transmitted from the vehicle to the bead portion to escape from the tread portion to the road surface.

Therefore, it is an object of this disclosure to provide a tire having a structure that facilitates the dissipation of static electricity from the vehicle to the road surface.

Solution to Problem

The gist structure of this disclosure is as follows.
(1) A tire comprising:
 a tread portion,
 a pair of bead cores embedded in a pair of bead portions,
 a carcass comprising one or more carcass plies, each of which consists of a carcass body portion straddling toroidally over the pair of bead cores and a carcass turn-up portions extending from the carcass body portion and folded back around the bead cores, and
 a reinforcement member comprising one or more reinforcement layers disposed on the outer side in the tire radial direction of a crown portion of the carcass, wherein
 a bead filler is disposed on the outer side in the tire radial direction of the bead core, and a rubber chafer is disposed on the outer side in the tire width direction of the bead filler,
 the tire further comprises a conductive member,
 an inner end in the tire radial direction of the conductive member is located at a tire radial position of an outer end in the tire radial direction of the rubber chafer or in a tire radial region inner in the tire radial direction than the outer end in the tire radial direction of the rubber chafer, and
the conductive member extends from the inner end in the tire radial direction thereof outwardly in the tire radial direction to at least a position of any of the reinforcement layers which is conductive among the one or more reinforcement layers.

Advantageous Effect

According to the present disclosure, it is possible to provide a tire having a structure that facilitates the dessipation of static electricity from the vehicle to the road surface.

BRIEF DESCRIPTION OF THE DRAWINGS

In the accompanying drawings.

DETAILED DESCRIPTION

The following is a detailed description of the embodiment(s) of this disclosure with reference to the drawings.

First Embodiment

Figure 1:
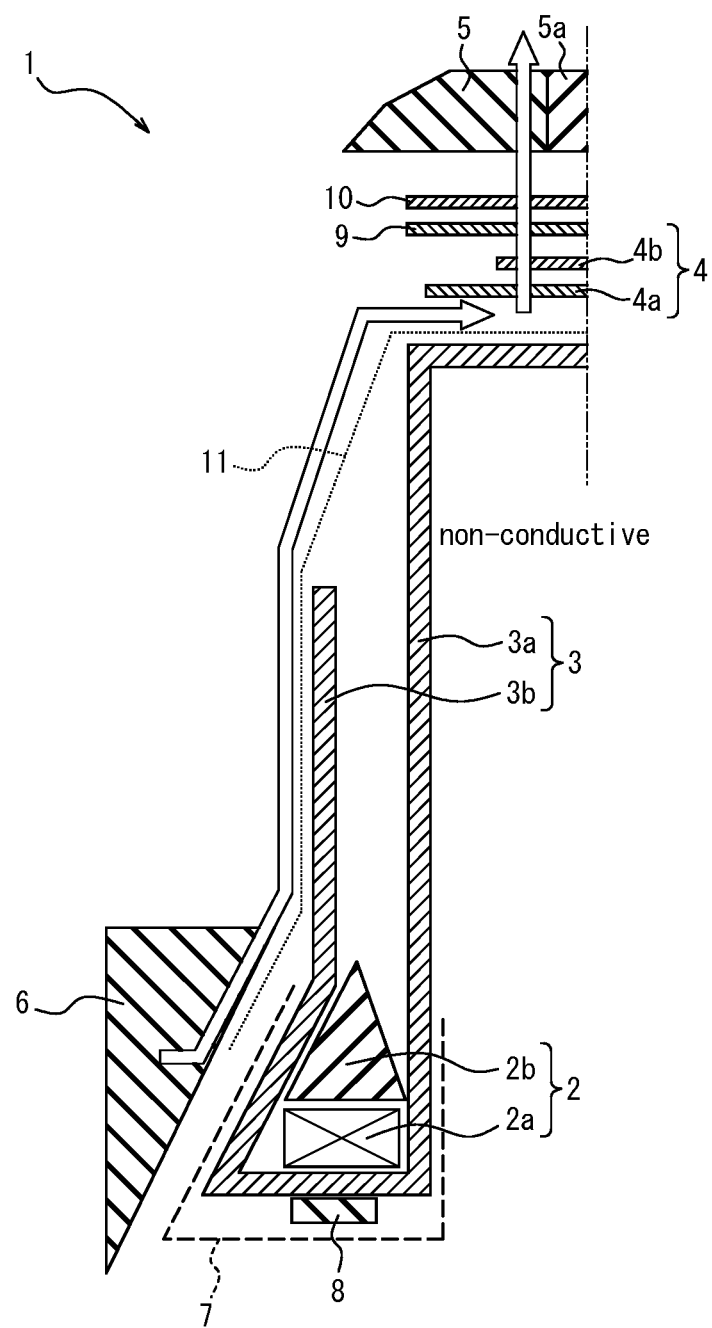
FIG. 1 is a schematic diagram of a tire structure of a tire according to the first embodiment of this disclosure.

FIG. 1 is a schematic diagram of a tire structure of a tire according to the first embodiment of this disclosure. This tire 1 is a pneumatic tire in this example. As illustrated schematically in FIG. 1, the tire 1 comprises a pair of bead portions 2, a carcass 3, a reinforcement member disposed on the outer side in the tire radial direction of the carcass 3, and a tread portion 5.

The pair of bead cores 2a are embedded in a pair of bead portions 2, and bead fillers 2b are disposed on the outer side in the tire radial direction of the bead cores 2a. The cross-sectional shape and material of the bead cores 2a are not limited, and can be of any configuration normally used in tires. The bead fillers 2b can have an abbreviated triangular cross-sectional shape, but the cross-sectional shape of the bead fillers 2b is not limited to this example, nor is its material.

The carcass 3 comprises one or more carcass plies, each of which consists of a carcass body portion 3a straddling toroidally over the pair of bead cores and a carcass turn-up portions 3b extending from the carcass body portion 3a and folded back around the bead cores 2a. In this embodiment, the carcass ply is made of organic fibers coated with rubber, and the coating rubber has a low loss tangent. This reduces the rolling resistance of the tire.

Here, the term "loss tangent" refers to the ratio (E"/E') of the dynamic loss modulus E" value to the dynamic storage modulus E' value obtained on a specimen of vulcanized rubber with a thickness of 2 mm, a width of 5 mm, and a length of 20 mm, at a temperature of 60° C., a frequency of 52 Hz, an initial strain of 2%, and a dynamic strain of 1%, using a dynamic tensile viscoelasticity measuring device. In this embodiment, the carcass ply is non-conductive (i.e., it does not function sufficiently as a conductive path for static electricity inside the tire to escape to the road surface).

In addition, rubber chafers (gum chafers) 6 are disposed on the outer side in the tire width direction of the bead fillers 2b. The rubber chafers 6 cover the carcass turn-up portions 3b from the outer side in the tire width direction. The rubber chafers 6 are conductive. The rubber chafers 6 are disposed on at least a portion of the bead portions 2 in contact with the rim.

Also, canvas chafers 7 are disposed around the bead cores 2a. The canvas chafers 7 cover the inner side in the tire radial direction of the bead cores 2a and both sides in the tire width direction of the bead cores 2a. The canvas chafers 7 are conductive. The canvas chafers 7 made up of a textile and rubber impregnated with the textile. The fabric consists of warp and weft yarns, and the warp and weft yarns are made of organic fibers.

As illustrated in FIG. 1, squeegee rubbers 8 are disposed on the inner side in the tire radial direction of the bead core 2a (in the illustrated example, on the inner side in the tire radial direction of the carcass turn-up portion 3b, and on the inner side in the tire radial direction of the canvas chafer 7). This prevents contact between the carcass ply and the canvas chafers 7, thereby preventing failure due to rubbing. The squeegee rubbers 8 are non-conductive.

Here, a reinforcement member comprising one or more reinforcement layers is disposed on the outer side in the tire radial direction of the crown portion of the carcass 3. In the illustrated example, the reinforcement member comprises a belt 4 consisting of two belt layers 4a and 4b, a belt reinforcement layer 9 disposed on the outer side in the tire radial direction of the belt 4, and a reinforcement rubber (tread under cushion) 10 disposed on the outer side in the tire radial direction of the belt reinforcement layer 9.

The belt layers 4a and 4b are composed of plies in which belt cords are coated with rubber and are inclined with respect to the tire circumferential direction (for example, at an inclination angle of 30 to 60 degrees) so as to intersect with each other between the layers. The belt cords can be, for example, steel cords. Thus, the belt layers 4a and 4b are conductive. Although the number of belt layers is two in this example, it may be one or more layers, and the inclination angle with respect to the tire circumferential direction is not limited to the above range.

The belt reinforcement layer 9 is composed of a ply in which cords are coated with rubber and extend in the tire circumferential direction. In this example, the belt layer 9 is a pair of layers covering only the end in the tire width direction of the belt 4. The cords can be, for example, steel cords. The belt reinforcement layer 9 is non-conductive. When the belt reinforcement layer 9 is a pair of layers, the tire widthwise position between the pair of layers forms a conductive path because no belt layers are positioned except for the position corresponding to the end of the belt. In this example, the belt reinforcement layer 9 is one layer, but it can be two or more layers. For example, an additional so-called cap layer which covers the entire belt width can be disposed between the belt 4 and the pair of layers in the tire radial direction. Alternatively, only the cap layer can be disposed. For the cap layer, it shall be conductive. Each reinforcement layer shall be conductive or non-conductive so as to form a conductive path, and each reinforcement layer is disposed only at a portion in the tire width direction, so that the region where the reinforcement layer is not disposed becomes a conductive path. In this embodiment, the tire 1 does not necessarily to have a belt reinforcement layer 9. Also, the belt reinforcement layer 9 can be disposed on the inner side in the tire radial direction than the belt 4.

The reinforcement rubber (tread under cushion) 10 is disposed between the tread portion 5 and the belt reinforcement layer 9 in the tire radial direction in the illustrated example. The tread under cushion 10 is conductive.

The tread portion 5 is less conductive. The tread portion 5 can be, for example, a so-called cap-and-base construction, in which the cap rubber is disposed on the outer side in the tire radial direction of the base rubber. A portion of the tread portion 5 in the tire width direction consists of antenna rubber 5a. The antenna rubber 5a is conductive. The antenna rubber 5a can be arranged continuously or intermittently in the tire circumferential direction.

Here, the tire 1 of this embodiment further comprises a conductive member 11. In this example, the conductive member 11 is a conductive fiber member. The conductive fiber member can be, for example, made of cotton fibers and pieces of SUS blended and twisted together. This allows the fiber to be lightweight and conductive. For weight reduction, the fiber preferably consists of only one strand.

Here, the inner end in the tire radial direction of the conductive member 11 is located at a tire radial position of an outer end in the tire radial direction of the rubber chafer 6 or in a tire radial region inner in the tire radial direction than the outer end in the tire radial direction of the rubber chafer 6, as illustrated. This results in electrical contact between the rubber chafer 6 and the inner end in the tire radial direction of the conductive member 11. In addition, the conductive member 11 extends from the inner end in the tire radial direction thereof outwardly in the tire radial direction to at least a position of any of the reinforcement layers which is conductive among the one or more reinforcement layers. In the first embodiment illustrated in FIG. 1, the tire 1 comprises a pair of conductive members 11, one in each half portion in the tire width direction bounded by the tire equatorial plane, and thus each conductive member 11 has an outer end in the tire radial direction. The outer ends in the tire radial direction of the conductive members 11 terminate at a position of an end of any of the reinforcement layers which is conductive among the one or more reinforcement layers (in the illustrated example, the belt layer 4a). In other words, the outer ends in the tire radial direction of the conductive members 11 terminate in a tire radial region between the crown portion of the carcass 3 and the innermost reinforcement layer in the tire radial direction which is conductive (in the illustrated example, belt layer 4a). As a result, the outer edge in the tire radial direction of the conductive member 11 and the belt 4a are in electrical contact.

The following is an explanation of the effects of the tire according to the first embodiment.

In this tire 1, first, since the coating rubber of the carcass ply is made of rubber with low loss tangent as described above, rolling resistance can be reduced and fuel efficiency can be improved. The carcass 3 is non-conductive.

On the other hand, in this tire 1, the rubber chafer 6, the belt layers 4a and 4b, the tire widthwise region between the pair of belt reinforcement layers 9, the tread under cushion 10, and the antenna rubber 5a are conductive. The inner end in the tire radial direction of the conductive member 11 is located at the tire radial position of the outer end in the tire radial direction of the rubber chafer 6 or in the tire radial region inner in the tire radial direction than the outer end in the tire radial direction of the rubber chafer 6 as illustrated, so that the rubber chafer 6 and the conductive member 11 are in electrical contact. In addition, the conductive member 11 extends from the inner end in the tire radial direction thereof outwardly in the tire radial direction to at least the position of any of the reinforcement layers which is conductive among the one or more reinforcement layers (in the illustrated example, the outer end in the tire radial direction of the conductive member 11 terminates at the location of the end of the belt layer 4a), so that the conductive member 11 and the belt layer 4a are in electrical contact.

Thus, in this tire 1, a conductive path is formed in the order of the rubber chafer 6, the conductive member 11, the belt layer 4a, the belt layer 4b, the tire widthwise region between the pair of belt reinforcement layers 9, the tread under cushion 10, and the antenna rubber 5a, where static electricity can be dissipated. This allows static electricity, which is accumulated inside the tire from the vehicle, to be dissipated from the rubber chafer 6 to the belt 4 and from the belt 4 to the road surface, through the above conductive path, as indicated by the arrow in FIG. 1.

In this way, even when the coating rubber of the carcass ply is made of a material to reduce the rolling resistance as described above, the structure can easily dissipate the static electricity from the vehicle to the road surface.

In addition, since the conductive member 11 is a conductive fiber member, the increase in weight due to the addition of the conductive member 11 can be controlled and the increase in rolling resistance can be suppressed. In particular, the conductive fiber member can be made of cotton fibers and pieces of SUS blended and twisted together, so that to make the conductive member lightweight and conductive.

Especially, in the first embodiment, the belt layer 4b, which is the innermost reinforcement layer in the tire radial direction, and the conductive member 11 are in electrical contact and the conductive member 11 terminates at the end of the belt layer 4b, so that the length of the conductive member 11 can be shortened to further control the weight gain and further reduce the increase in rolling resistance.

Second Embodiment

Figure 2:
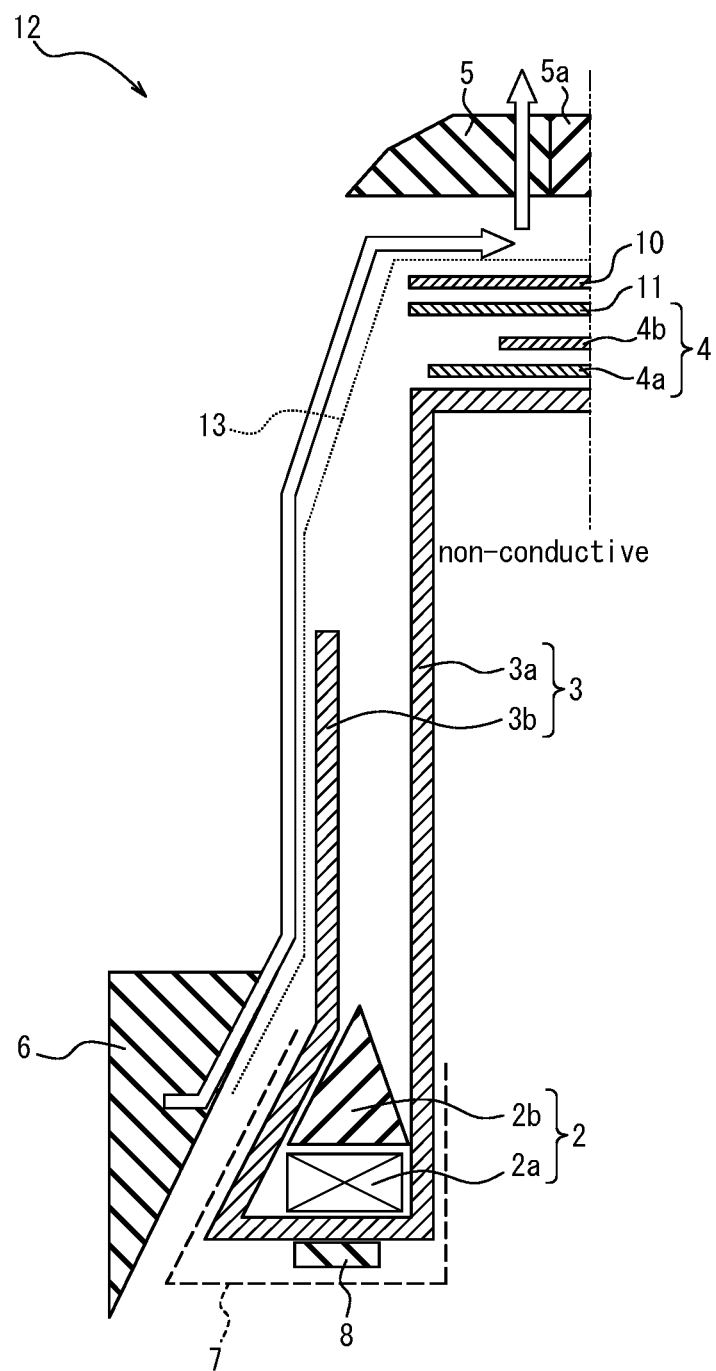
FIG. 2 is a schematic diagram of a tire structure of a tire according to the second embodiment of this disclosure.

FIG. 2 is a schematic diagram of a tire structure of a tire according to the second embodiment of this disclosure. The tire 12 of the second embodiment differs from the first embodiment only in the arrangement of the conductive member 13, and the composition of the other members and the material of the conductive member 13 are the same as those in the first embodiment, so the description is omitted.

First, the inner end in the tire radial direction of the conductive member 13 is located at a tire radial position of an outer end in the tire radial direction of the rubber chafer 6 or in a tire radial region inner in the tire radial direction than the outer end in the tire radial direction of the rubber chafer 6, as illustrated, and this is the same as in the first embodiment.

The conductive member 13 extends from the inner end in the tire radial direction thereof outwardly in the tire radial direction to at least a position of any of the reinforcement layers which is conductive among the one or more reinforcement layers, and for a pair of conductive members 13, the outer ends in the tire radial direction of the conductive members 13 terminate at a position of an end of any of the reinforcement layers which is conductive among the one or more reinforcement layers.

As illustrated in FIG. 2, the tire 12 of the second embodiment differs from the first embodiment in that the outer ends in the tire radial direction of the conductive members 13 terminate in a tire radial region between the tread portion 5 and the outermost reinforcement layer in the tire radial direction which is conductive among one or more reinforcement layers (in the illustrated example, the tread under cushion 10).

The following is an explanation of the effects of the tire according to the second embodiment.

Also for the second embodiment, since the coating rubber of the carcass ply is made of rubber with low loss tangent as described above, rolling resistance can be reduced and fuel efficiency can be improved. The carcass 3 is non-conductive. On the other hand, in this tire 12, the rubber chafer 6, the belt layers 4a and 4b, the tire widthwise region between the pair of belt reinforcement layers 9, the tread under cushion 10, and the antenna rubber 5a are conductive. The inner end in the tire radial direction of the conductive member 13 is located at a tire radial position of the outer end in the tire radial direction of the rubber chafer 6 or in a tire radial region inner in the tire radial direction than the outer end in the tire radial direction of the rubber chafer 6 as illustrated, so that the rubber chafer 6 and the conductive member 13 are in electrical contact. In addition, the conductive member 13 extends from the inner end in the tire radial direction thereof outwardly in the tire radial direction to at least a position of any of the reinforcement layers which is conductive among the one or more reinforcement layers (in the illustrated example, the outer end in the tire radial direction of the conductive member 13 terminates at the location of the end of the tread under cushion 10), so that the conductive member 13 and the tread under cushion 10 are in electrical contact.

Thus, in this tire 12, a conductive path is formed in the order of the rubber chafer 6, the conductive member 11, the tread under cushion 10, and the antenna rubber 5a, where static electricity can be dissipated. This allows static electricity, which is accumulated inside the tire from the vehicle, to be dissipated through the above conductive path, as indicated by the arrow in FIG. 2.

In this way, even when the coating rubber of the carcass ply is made of a material to reduce the rolling resistance as described above, the structure can easily dissipate the static electricity from the vehicle to the road surface.

In addition, since the conductive member 13 is a conductive fiber member, the increase in weight due to the addition of the conductive member 13 can be controlled and the increase in rolling resistance can be suppressed. In particular, the conductive fiber member can be made of cotton fibers and pieces of SUS blended and twisted together, so that to make the conductive member lightweight and conductive.

Especially, in the second embodiment, the tread under cushion 10, which is the outermost reinforcement layer in the tire radial direction, and the conductive member 13 are in electrical contact, so static electricity can be more reliably dissipated to the road surface. In this case, the length of the conductive member 13 becomes longer as seen in the tire radial direction (when compared to the first embodiment, for example). Therefore, in this example, the width in the tire width direction of the tread under cushion 10 is larger than the width in the tire width direction of the maximum width belt layer (belt layer 4b, in this example), and the conductive member 13 is configured to terminate at the position of the end of the tread under cushion 10, thereby shortening the length of the conductive member 13 as seen in the tire width direction, so that the increase in weight can be controlled and the increase in rolling resistance can be suppressed.

In addition to the configurations illustrated in FIGS. 1 and 2, when the tire comprises two or more reinforcement layers, the tire can also be configured so that the outer end in the tire radial direction of the conductive member terminates in a tire radial region between two of the reinforcement layers which are conductive and adjacent to each other in the tire radial direction. In this case, even when the coating rubber of the carcass ply is made of a material to reduce the rolling resistance as described above, the structure can easily dissipate static electricity from the vehicle to the road surface. Since the length of the conductive member extending in the tire radial direction is shorter than in the second embodiment, the effect of weight reduction can be achieved, and since the number of members forming the conductive path is less than in the first embodiment, the effect of dissipating static electricity can be obtained more reliably.

In the above embodiment, the case with a pair of conductive members is illustrated, but the present disclosure is not limited to this case. The conductive member can be configured so that one conductive member extends continuously from a tire radial position of the outer end in the tire radial direction of the rubber chafer or a tire radial region inner in the tire radial direction than the outer end in the tire radial direction of the rubber chafer in one half of the tire in the tire width direction to a tire radial position of the outer end in the tire radial direction of the rubber chafer or a tire radial region inner in the tire radial direction than the outer end in the tire radial direction of the rubber chafer in another half of the tire in the tire width direction. In this case, the conductive member extends throughout any of the reinforcement layers which is conductive among one or more of the reinforcement layers. This configuration also facilitates the dissipation of static electricity from the vehicle to the road surface.

In one aspect, the inner end in the tire radial direction of the conductive member is in electrical contact with the rubber chafer (i.e., the conductive member is configured such that its inner end in the tire radial direction forms a conductive path with the rubber chafer). The conductive member is in electrical contact, at least, with any of the reinforcement layers which is conductive among one or more of the reinforcement layers, from the inner end in the tire radial direction thereof outwardly in the tire radial direction (that is, the conductive member is configured to form a conductive path with the reinforcement layer, which is conductive). Preferably, the tire comprises a pair of conductive members, wherein the outer end in the tire radial direction of the conductive member is in electrical contact with any of the reinforcement layers which is conductive (that is, the conductive member is configured to form a conductive path with the reinforcement layer which is conductive at the outer end in the tire radial direction thereof).

REFERENCE SIGNS LIST

1 Tire
2 Bead portion
3 Carcass
4 Belt
5 Tread portion
6 Rubber chafer
7 Canvas chafer
8 Squeegee rubber
9 Belt reinforcement layer
10 Tread under cushion
11 Conductive member
12 Tire
13 Conductive member

The invention claimed is:

1. A tire comprising:
a tread portion,
a pair of bead cores embedded in a pair of bead portions,
a carcass comprising one or more carcass plies, each of which consists of a carcass body portion straddling toroidally over the pair of bead cores and a carcass turn-up portions extending from the carcass body portion and folded back around the bead cores,
a reinforcement member comprising two conductive reinforcement layers adjacent to each other in the tire radial direction disposed on the outer side in the tire radial direction of a crown portion of the carcass,
a tread under cushion disposed on the outer side in the tire radial direction of the two conductive reinforcement layers, the tread under cushion being conductive, and
an antenna rubber disposed on the outer side in the tire radial direction of the tread under cushion, wherein
a bead filler is disposed on the outer side in the tire radial direction of the bead core, and a rubber chafer is disposed on the outer side in the tire width direction of the bead filler,
the tire further comprises a pair of conductive members, each extending in the tire radial direction,
a tire radial inner end of each conductive member of the pair of conductive members is located at a tire radial outer end of the rubber chafer or in a tire radial region farther inward in the tire radial direction than the tire radial outer end of the rubber chafer,
a tire radial outer end of the each conductive member of the pair of conductive members terminates in a region between the two conductive reinforcement layers in the tire radial direction,
the tire radial outer end of the each conductive member terminates at a position located inward in the tire width direction than an end in the tire width direction of the reinforcement layer having the smallest width among the two conductive reinforcement layers, and
the antenna rubber is free of direct contact with the pair of conductive members.

2. The tire according to claim 1, wherein the each conductive member of the pair of conductive members is a conductive fiber member.

3. The tire according to claim 2, wherein the conductive fiber member is made of cotton fibers and pieces of SUS blended and twisted together.

4. The tire according to claim 1, wherein the carcass is non-conductive.

5. The tire according to claim 1, wherein the rubber chafer, the region between the two conductive reinforcement layers in the tire radial direction, and the antenna rubber are conductive.

* * * * *